US012730782B1

(12) United States Patent
Cuba et al.

(10) Patent No.: US 12,730,782 B1
(45) Date of Patent: Sep. 8, 2026

(54) RETRIEVAL-AUGMENTED METADATA GENERATION

(71) Applicant: Oracle International Corporation, Redwood Shores, CA (US)

(72) Inventors: Eduard Cuba, Zurich (CH); Matteo Santelmo, Ecublens (CH); Ikram Mekkid, Casablanca (MA); Hesam Fathi Moghadam, Sunnyvale, CA (US); Rhicheek Patra, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/208,989

(22) Filed: May 15, 2025

(51) Int. Cl.
*G06F 16/20* (2019.01)
*G06F 16/21* (2019.01)
*G06F 16/22* (2019.01)
*G06F 16/242* (2019.01)

(52) U.S. Cl.
CPC .......... *G06F 16/211* (2019.01); *G06F 16/221* (2019.01); *G06F 16/2433* (2019.01)

(58) Field of Classification Search
CPC ... G06F 16/211; G06F 16/221; G06F 16/2433
See application file for complete search history.

(56) References Cited

U.S. PATENT DOCUMENTS 12,554,932 B2 * 2/2026 Chandrahasan .... G06F 16/9537
2024/0403373 A1 12/2024 Chao
2025/0045256 A1 2/2025 Gottlob
2025/0278434 A1 * 9/2025 Mishaeli ............... G06F 16/211

OTHER PUBLICATIONS

M. Song, Enhancing RAG Performance by Representing Hierarchical Nodes in Headers for Tabular Data, in IEEE Access, vol. 13, pp. 85072-85083, 2025 [retrieved Mar. 19, 2026]. Retrieved from the Internet: doi: 10.1109/ACCESS.2025.3569872 (Year: 2025).*
Suhara et al., Annotating Columns with Pre-trained Language Models, Mar. 1, 2022 [retrieved Mar. 19, 2026]. Retrieved from the Internet: https://arxiv.org/abs/2104.01785 (Year: 2022).*

(Continued)

*Primary Examiner* — Kristopher Andersen
(74) *Attorney, Agent, or Firm* — Hickman Becker Bingham Ledesma LLP

(57) ABSTRACT

Here is schema generation from a data table and reference documentation, including inferential analysis and generation of natural language. A large language model (LLM) inferentially generates an initial column summary that consists of natural language that describes exactly one column of a data table. From a vector store that contains many fixed-size portions of many reference documents, a few nearest neighbor portions are dense retrieved that are semantically similar to the initial column summary. From the initial column summary and the nearest neighbor portions, the LLM inferentially generates an expanded column summary that describes the column, including inferring that some nearest neighbor portions should be excluded. From the expanded column summary, the LLM inferentially generates a) a data schema that consists of semi-structured text that describes the data table, including a column comment that contains natural language that describes the column.

20 Claims, 5 Drawing Sheets

(56) References Cited

OTHER PUBLICATIONS

Zhang et al., "Beyond Relevant Documents: A Knowledge-Intensive Approach for Query-Focused Summarization using Large Language Models" arXiv:2408.10357 (2024) 18 pages.
Wang et al., "Query2doc: Query Expansion with Large Language Models" arXiv:2303.07678 (2023) 10 pages.
Sui et al., "Table Meets LLM: Can Large Language Models Understand Structured Table Data? A Benchmark and Empirical Study" arXiv:2305.13062 (2024) 11 pages.
Suhara et al., "Annotating Columns with Pre-trained Language Models" downloaded from https://arxiv.org/pdf/2104.01785 (15 pages).
Lewis et al., "Retrieval-Augmented Generation for Knowledge-Intensive NLP Tasks" arXiv:2005.11401 (2021) 19 pages.
Jagerman et al., "Query Expansion by Prompting Large Language Models" arXiv:2305.03653 (2023) 7 pages.
Brown et al., "Language Models are Few-Shot Learners" arXiv:2005.14165 (2020) 75 pages.

* cited by examiner

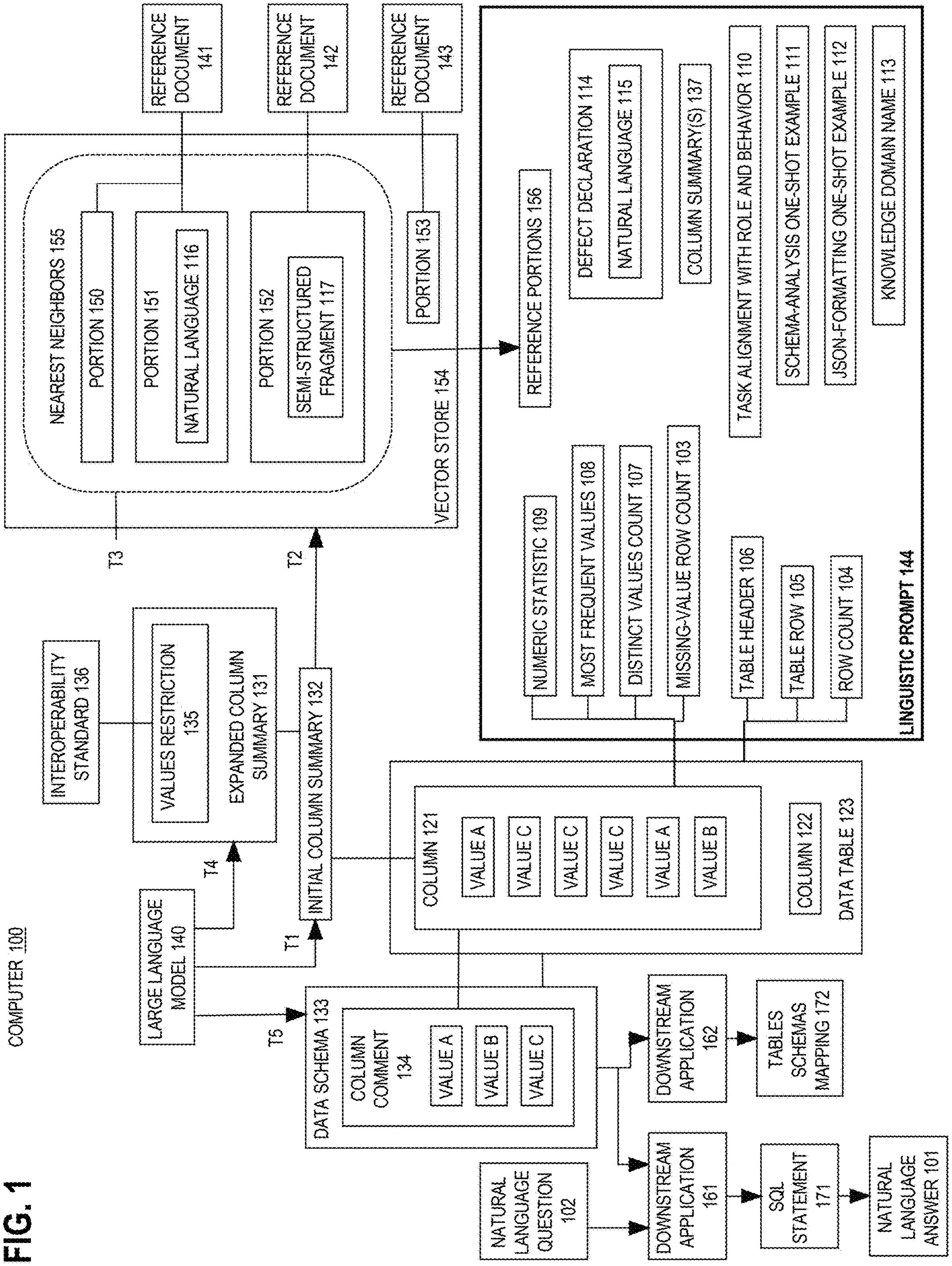

FIG. 1
COMPUTER 100
INTEROPERABILITY STANDARD 136
LARGE LANGUAGE MODEL 140
VALUES RESTRICTION 135
EXPANDED COLUMN SUMMARY 131
T4
T5
T1
INITIAL COLUMN SUMMARY 132
T2
T3
NEAREST NEIGHBORS 155
PORTION 150
PORTION 151
NATURAL LANGUAGE 116
PORTION 152
SEMI-STRUCTURED FRAGMENT 117
PORTION 153
VECTOR STORE 154
REFERENCE DOCUMENT 141
REFERENCE DOCUMENT 142
REFERENCE DOCUMENT 143
DATA SCHEMA 133
COLUMN COMMENT 134
VALUE A
VALUE B
VALUE C
COLUMN 121
VALUE A
VALUE C
VALUE C
VALUE C
VALUE A
VALUE B
COLUMN 122
DATA TABLE 123
NATURAL LANGUAGE QUESTION 102
DOWNSTREAM APPLICATION 161
DOWNSTREAM APPLICATION 162
SQL STATEMENT 171
TABLES SCHEMAS MAPPING 172
NATURAL LANGUAGE ANSWER 101
NUMERIC STATISTIC 109
MOST FREQUENT VALUES 108
DISTINCT VALUES COUNT 107
MISSING-VALUE ROW COUNT 103
TABLE HEADER 106
TABLE ROW 105
ROW COUNT 104
REFERENCE PORTIONS 156
DEFECT DECLARATION 114
NATURAL LANGUAGE 115
COLUMN SUMMARY(S) 137
TASK ALIGNMENT WITH ROLE AND BEHAVIOR 110
SCHEMA-ANALYSIS ONE-SHOT EXAMPLE 111
JSON-FORMATTING ONE-SHOT EXAMPLE 112
KNOWLEDGE DOMAIN NAME 113
LINGUISTIC PROMPT 144

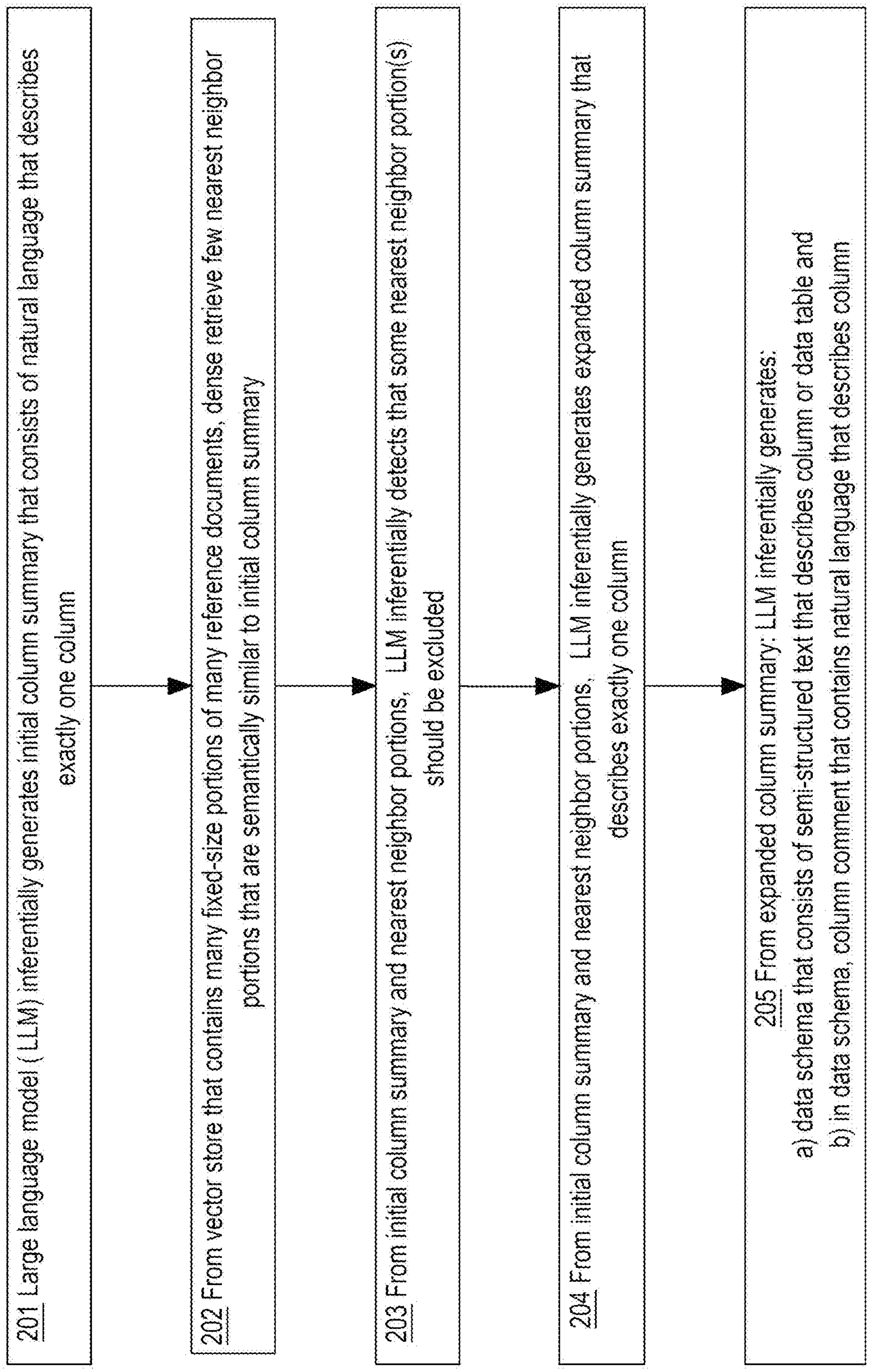

FIG. 2

201 Large language model (LLM) inferentially generates initial column summary that consists of natural language that describes exactly one column 202 From vector store that contains many fixed-size portions of many reference documents, dense retrieve few nearest neighbor portions that are semantically similar to initial column summary 203 From initial column summary and nearest neighbor portions, LLM inferentially detects that some nearest neighbor portion(s) should be excluded 204 From initial column summary and nearest neighbor portions, LLM inferentially generates expanded column summary that describes exactly one column 205 From expanded column summary: LLM inferentially generates:
a) data schema that consists of semi-structured text that describes column or data table and
b) in data schema, column comment that contains natural language that describes column

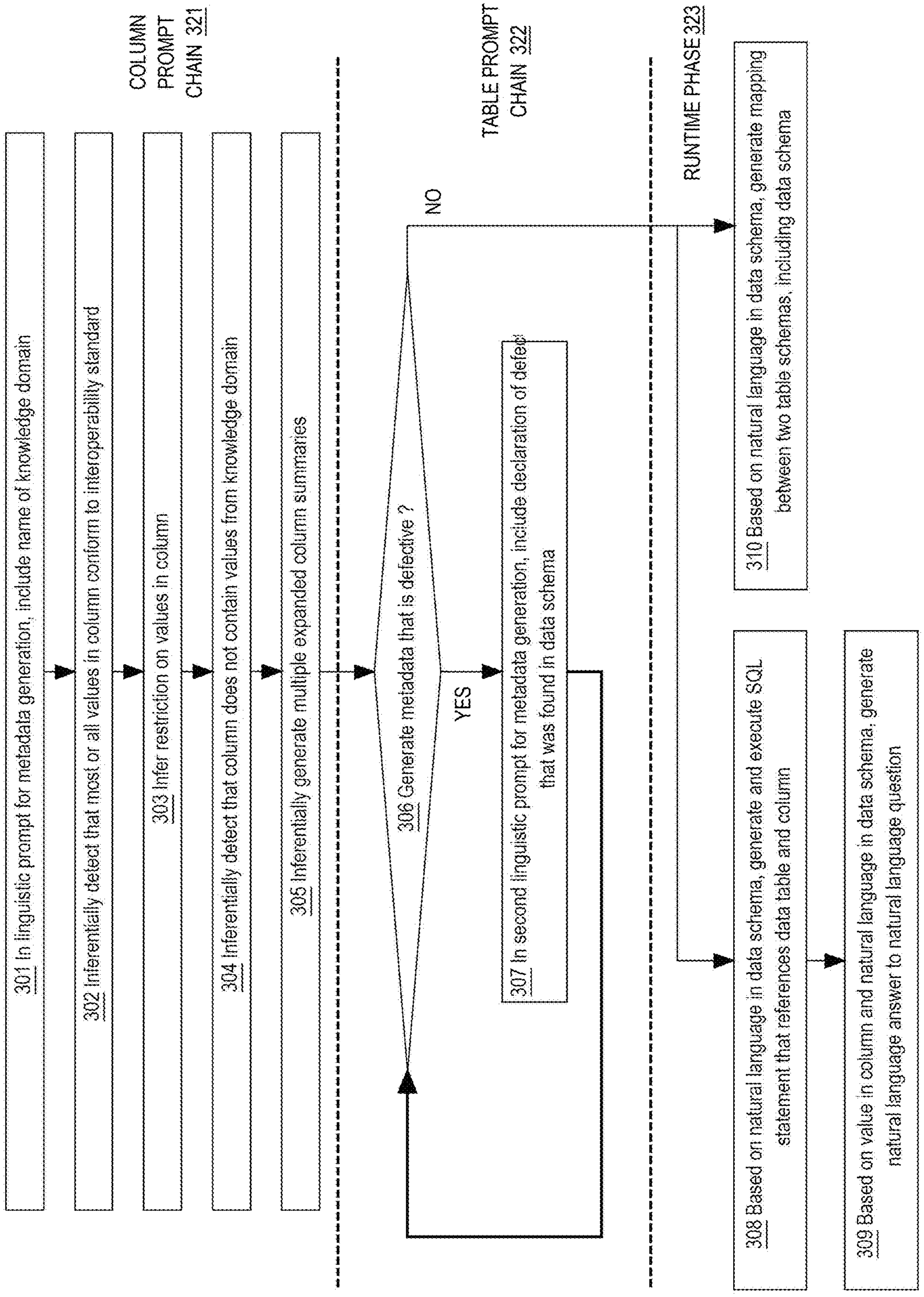

FIG. 3
301 In linguistic prompt for metadata generation, include name of knowledge domain
302 Inferentially detect that most or all values in column conform to interoperability standard
303 Infer restriction on values in column
304 Inferentially detect that column does not contain values from knowledge domain
305 Inferentially generate multiple expanded column summaries
COLUMN PROMPT CHAIN 321
306 Generate metadata that is defective ?
YES
NO
307 In second linguistic prompt for metadata generation, include declaration of defec
that was found in data schema
TABLE PROMPT CHAIN 322
RUNTIME PHASE 323
308 Based on natural language in data schema, generate and execute SQL statement that references data table and column
309 Based on value in column and natural language in data schema, generate natural language answer to natural language question
310 Based on natural language in data schema, generate mapping between two table schemas, including data schema DISPLAY 412
INPUT DEVICE 414
CURSOR CONTROL 416
MAIN MEMORY 406
ROM 408
STORAGE DEVICE 410
BUS 402
PROCESSOR 404
COMMUNICATION INTERFACE 418
400
NETWORK LINK 420
SERVER 430
428
INTERNET
ISP
426
LOCAL NETWORK 422
HOST 424

SOFTWARE SYSTEM 500

502

502A
APPLICATION PROGRAM 1

502B
APPLICATION PROGRAM 2

502C
APPLICATION PROGRAM 3

[...]

502N
APPLICATION PROGRAM N

510
OPERATING SYSTEM
(e.g., WINDOWS, UNIX, LINUX, MAC OS, IOS, ANDROID, OR LIKE)

515
GRAPHICAL USER INTERFACE (GUI)

530
VIRTUAL MACHINE MONITOR ( VMM)

BARE HARDWARE (e.g., COMPUTING DEVICE 400)

RETRIEVAL-AUGMENTED METADATA GENERATION

FIELD OF THE INVENTION

Herein is schema generation from a data table and reference documentation, including inferential analysis and generation of natural language.

BACKGROUND

Data integration and migration projects can be costly and time-consuming, often requiring months or years of development time. This may, for example, present a significant bottleneck in onboarding new customers, entering new markets, and accelerating time-to-value. Furthermore, high-quality metadata may also be essential for both humans and artificial intelligence (AI) systems to understand, interpret, and consume tabular data effectively, particularly in highly domain-specific areas such as finance, public safety, or healthcare. However, meaningful metadata is often scattered or unavailable due to siloed data management, data privacy concerns, and the use of legacy systems.

Tabular data is a common representation format for compound data, especially for storage of bulk data such as in a spreadsheet or database table or for legibility of presentation in a user manual or technical document intended for a human. Data processing automation may readily tolerate otherwise insignificant deficiencies of description such as schema-less content, mangled identifiers, and missing comments. Those various descriptive deficiencies may render data unintelligible, which may be a more or less complete obstacle to important techniques such as analysis by hand or semantic analytics. Often table/column names use acronyms or abbreviations whose implied meaning may require expert domain knowledge to disambiguate. In many cases, descriptions of contents of a table or column are not provided or are scattered across multiple documents in the internal knowledge base of a company, which may be too costly to identify in ways of the state of the art.

Integration, migration, and comprehension of data has significant hurdles to bringing together data from disparate systems and moving the data to new platforms. These technology challenges can include data silos, such as when different departments or systems store data in incompatible formats and structures. Inaccuracy, such as a mistaken meaning of a table or column, would be catastrophic to any computer application whose internal or interface design were based on the mistaken meaning. For example, input data of mistaken meaning cannot be used to produce valid output, which is a phenomenon known in computer science as garbage in garbage out (GIGO).

For example, semantic inaccuracy may be quantitatively measured by any of the following metrics. Polysemy (i.e. lexical ambiguity) measures the number of possible meanings for individual words. Word error rate (WER) measures words that are typographically incorrect due to, for example, mistaken substitution, insertion, or omission. Metric for evaluation of text retrieval (METEOR) measures semantic fidelity by considering synonym matching and paraphrasing, including stemming and lemmatization. BERTScore measures semantic fidelity and linguistic fluency.

Error metrics such as those may quantitatively measure performance of any mode of unreliable text generation such as speech comprehension or, herein, table schema comprehension and generation. Thus, semantic automation for tabular data is a technologic problem whose performance may be objectively and empirically inaccurate. For the state of the art to achieve a desired accuracy, which sometimes may be impossible, entails quantifiable computational latency, for which processor time is a precious physical resource for internal operation of a computer.

BRIEF DESCRIPTION OF THE DRAWINGS

In the drawings:

FIG. 1 is a block diagram that depicts an example computer that inferentially generates column summaries and a data schema from a data table and from reference documents, including inferential analysis and/or inferential generation of natural language by a large language model (LLM);

FIG. 2 is a flow diagram that inferentially generates JavaScript object notation (JSON) that is a data schema such as a table schema or a column schema;

FIG. 3 is a flow diagram that depicts example inferential activities that a computer may perform to regeneratively refine a data schema that is a table schema for a data table;

DETAILED DESCRIPTION

Figure 4:
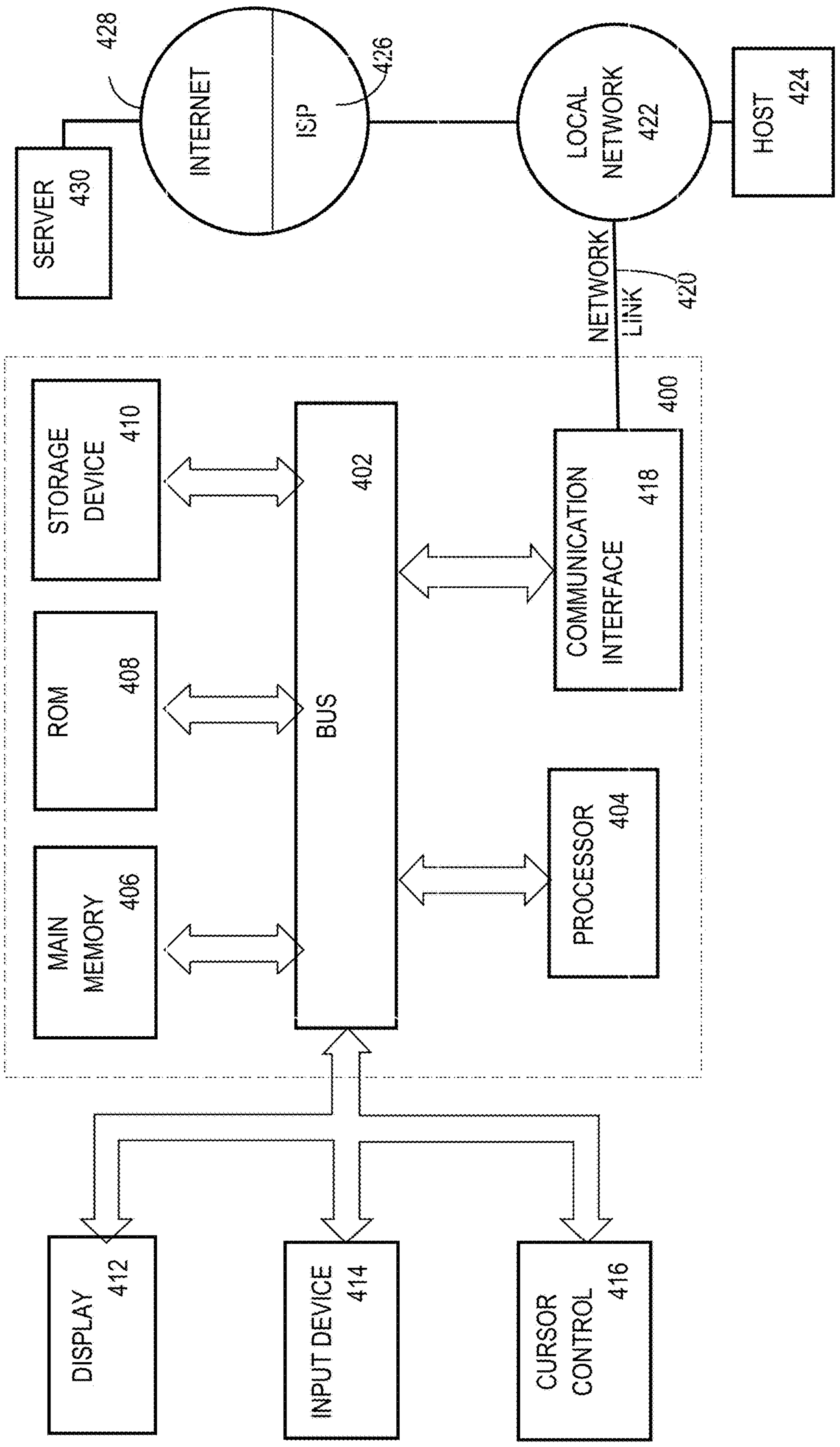
FIG. 4 is a block diagram that illustrates a computer system upon which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Here is schema generation from a data table and reference documentation, including inferential analysis and generation of natural language. This is an innovative approach for synthetic metadata generation for tabular data sources, including optimal prompting and retrieval techniques. This approach builds upon and extends retrieval augmented generation (RAG) to enhance quality of information extracted from unstructured documentation and improve alignment with domain-specific knowledge. This approach integrates user feedback through a human-in-the-loop paradigm to further improve the quality and domain-alignment of the generated metadata. Experimental results demonstrated increased accuracy of downstream tasks, such as schema mapping that entails aligning source and target tables and columns and data mapping that entails converting data types and column semantics.

This is a robust and domain-agnostic technique to generate structured metadata about tabular data sources. This approach achieves the following technologic feats. This approach accurately extracts relevant context from unstructured documents to inform metadata generation. Structured metadata is automatically generated such as table and column descriptions and data types for tabular data sources. Human expert supervision is seamlessly integrated into the metadata generation process to improve alignment and accuracy, including human-in-the-loop workflow. The goal of the generated metadata is to accurately describe the data semantics of each input table at both the table and column levels. This entails a metadata generation pipeline that takes scattered and incomplete schematic information as input. In some scenarios data samples conform to the incomplete schema information, including conforming to unstructured documentation that describes the semantics of the data source. Based on these inputs, the system generates the following metadata: in natural language, a highly meaningful name and description of the table, as well as a highly meaningful name, description, and data-type information for each column in the table.

The metadata generation process integrates large language models (LLMs) into the dataflow. To achieve high-quality generated metadata and minimize hallucinations, inferential generation herein is guided by user-provided unstructured documentation describing the standards and semantics of data table(s). Existing reference documentation can be provided in common formats such as plain-text, portable document format (PDF), Document Open XML (DOCX, extensible markup language), hypertext markup language (HTML), or any of the 150 written content formats that are supported by Oracle Text that is a text analytics engine. Content relevant to each table and column is retrieved from the documentation and provided as context for metadata generation. To ensure the relevance of retrieved context provided to the LLM, the retrieved documentation is preprocessed, including inferential summarization. The contextual understanding of a given table may be presented to a human analyst before metadata generation begins, thereby improving the transparency of the generation process and facilitating potential errors to be caught and corrected through interactive analyst feedback. Afterwards, structured metadata is inferentially generated for each input table and its columns based on schema comprehension, data samples, and retrieved documentation.

The pipeline consists of a sequence of two stages. The first stage is referred to herein as preprocessing or documentation processing. From the provided documentation, the first stage retrieves chunks of information that are relevant to the given table and the table's columns. The first stage assesses the relevance of each chunk to generative inferencing, and composes a summarized document describing the data table semantics. The second stage is metadata generation that uses the LLM informed by the retrieved context and available input data to generate structured metadata for the table and its columns. The context includes the serialized table structure, summarized and reviewed knowledge extracted from the provided documents, and statistics derived from the data samples. This process can be iteratively repeated, incorporating analyst feedback provided in natural language.

Query expansion herein entails the following, where a query being expanded is a natural language request, not a statement in structured query language (SQL) nor data query language (DQL). Documents are parsed, converted to plain text, chunked by splitting into pieces of fixed size, vectorized (converted to a numeric representation) using an embedding model, and stored in a searchable vector store. Then, during response generation, a fixed number of chunks that are most relevant to the user query are retrieved and inserted into the user prompt as context. In the case of metadata generation for tabular data, the queries are based on existing table and column names, which do not provide a good basis for semantic embeddings. To address this issue, query expansion generates plausible pseudo-metadata descriptions and uses them as queries to perform semantic similarity searches on the vector store. Query expansion reformulates the input query by incorporating a plausible response, thereby improving the query's alignment with relevant chunks of documentation and enhancing retrieval recall.

While query expansion improves retrieval quality, the top k elements retrieved from the vector store are not guaranteed to be relevant and, for example, the number of actually relevant documents may be lower than k. Herein, query-focused summarization (QFS) uses an LLM to extract relevant information for metadata generation from retrieved chunks, including inferentially summarizing this relevant information. QFS improves the relevance of the retrieved context by prioritizing query-aligned information and discarding unrelated details. Additionally, QFS makes the extracted knowledge concise and human-understandable.

The second stage of the pipeline is the metadata generation itself, where the context collected in the first stage is included in LLM prompts to generate metadata for the input tables. First, metadata is generated for each table column independently, providing a meaningful name, description, data type, precision, scale for numeric columns, date format for date columns, and the maximum number of characters for text columns. The metadata generated for each column is then used as context to generate a meaningful name and description for the entire table.

The LLM is prompted using static in-context learning (ICL), where an example task output is provided in the context for single-shot learning, along with instructions to provide a JavaScript object notation (JSON) formatted answer to enable structural verification of the generated output. Additionally, a human analyst's feedback can be included in the prompt for subsequent generations to refine the LLM response based on feedback on previously generated metadata. In such cases, the LLM prompt incorporates its previous generation result, along with the analyst feedback. This process can be repeated until inferentially regenerated output is sufficiently accurate. Following each inferential generation step, the output of the LLM is parsed and validated using rule-based verification. If any verification step fails, an error message explaining the issue is appended to the prompt, along with the output that raised the error, and the LLM is prompted to correct the error. For instance, the system verifies that the generated metadata adheres to the required JSON structure, including proper syntax and formatting. If the generated metadata is valid, it is stored in a glossary that is a structured dictionary for collecting all metadata attributes for the input table, and this glossary will be the output of the metadata generation step. Incorporation of information extracted from user documentation enables the LLM to better understand the context of the technical inputs and to utilize specific terminology when inferentially generating content, resulting in more accurate output.

This approach has at least the following innovations. Metadata generation is guided by accepting unstructured documents containing pertinent knowledge about data tables in common file formats discussed above and herein. Context retrieval for table and column metadata has increased accuracy. This approach extends a RAG approach for table and column metadata retrieval using query expansion and query-focused summarization to enhance retrieval accuracy and ensure the relevance of extracted information. Iterative refinement of generated metadata based on analyst feedback in natural language is supported. To improve the LLM's comprehension of table schemas and data domains, specialized textual table-metadata representation is provided in Markdown, including the following information fields.

Table schema and sample statistics improve the LLM's comprehension of the input table structure, table content, and the value distribution for each column. A preliminary data type is heuristically detected from data samples using a rule-based system to help the LLM infer an adequate data type. Extracted documentation knowledge and subject area are information that allows the LLM to adhere to domain-specific language and maintain relevance and correctness. Analyst feedback in natural language ensures correctness, overcomes hallucination, and further improves the alignment of generations to expert preferences.

This approach has at least the following advantages. The system allows iterative refinement of generated metadata by integrating feedback from the analyst. This improves the alignment with the analyst's expectations and enables seamless error correction. By generating metadata for each column of a table independently, the system scales to large tables without incurring any limitations related to context length and enables column- and table-wise parallelization to increase throughput. For example, multiple columns in a data table may be concurrently processed, and multiple tables may be concurrently processed. The system relies on general-purpose (e.g. opaque, black box) models and is not bound to any particular knowledge domain. The inferentially generative pipeline herein does not require finetuned models for any pipeline stage, the pipeline can be updated to use the most recent and advanced LLM and embedding models. This pipeline can be used as a preliminary step to enhance data needed by other downstream tasks, such as schema mapping algorithms for data integration or SQL query generators, which will benefit from having structured, detailed, and complete descriptions.

1.0 Example Computer

FIG. 1 is a block diagram that depicts an example computer 100 that inferentially generates column summaries 131-132 and data schema 133 from data table 123 and from reference documents 141-143, including inferential analysis and/or inferential generation of natural language 102, 115-116, 132, and 134 by large language model (LLM) 140. Computer 100 may be one or more computers such as a rack server such as a blade, a personal computer, a mainframe, or a virtual computer. All components shown in FIG. 1 may be respectively stored and operated in volatile or nonvolatile storage of computer 100.

Computer 100 operates in a sequence of times T1-T5 to inferentially generate data schema 133. At three times that are T1 and T4-T5, LLM 140 is invoked to inferentially generate a respective distinct type of (e.g. intermediate) result 131-133. Text components 101-102, 106, 110-117, 131-137, 141-144, 150-153, 156, and 171-172 consist of text and may be processed as text and referred to herein as text. Whether values A-C and 108 are or are not text (i.e. strings) depends on the embodiment, and they may instead be numeric for example. Quantities 103-105 and 107-109 are numeric and can be converted into text for inclusion in other text. Text herein is composable by concatenation. For example as discussed later herein, linguistic prompt 144 may contain some or all of components 103-115, 137, and 156 that are shown in linguistic prompt 144, and any of those components may be converted to text (if not already text) and included by concatenation in linguistic prompt 144.

1.1 Natural Language Processing (NLP)

After time T5 as discussed later herein, various downstream application(s) 161-162 may accept data schema 133 as input. Herein, a downstream application is any software component that (e.g. inferentially) analyzes data schema 133 to generate a final result, such as natural language answer 101. In an embodiment discussed later herein, a user interactively asks natural language question 102 that is (e.g. implicitly, not expressly) about data table 123 that is a tabular data structure consisting of table columns 121-122 and table rows such as table row 105. Depending on the embodiment, data table 123 may be a database table such as in a relational database, a spreadsheet such as in a comma-separated values (CSV) text file, or a typographic table in an electronic document such as a word processor document that also contains natural language. Herein, data containers 121-123 are treated as read only.

Natural language is text that may be processed as a sequence of characters or as a sequence of lexical tokens that each is itself a sequence of character(s). An embodiment may treat whitespace as a separator between tokens such as natural words or punctuation. Either of components 100 or 140 may decompose linguistic prompt 144 into lexical tokens to be processed. At distinct times T1 and T4-T5, LLM 140 accepts a respective distinct instance of linguistic prompt 144, and those different prompt instances may have completely different text for task alignment with role and behavior 110. As discussed later herein, only some of those instances of linguistic prompt 144 contain table row 105. Presented herein are three distinct example prompt templates for use at respective times T1 and T4-T5 to respectively instantiate (i.e. generate an instance of) different forms of linguistic prompt 144.

1.2 Query Expansion

Time T1 is a temporal phase that may be referred to herein as query expansion. Here, the so-called query is not natural language question 102 but, instead, is a request to "generate plausible metadata" according to the following example prompt template for query expansion at time T1.

#Instruction:

You're a helpful assistant for metadata generation for database tables coming from economic and finance domain. Given the structure of a table, you will be asked to generate plausible metadata for each column. In particular, you should create a truthful and correct description of what the column contains and a plausible datatype (as the column is part of a database table). You will see one example of how to do so.

#Example:

{{one_shot_example}}

Now complete the same task considering the following input.

Input

Generate metadata for the column '{{column_physical_name}}' of the '{{table_physical_name}}' table.

Table:

{{table_markdown_representation}} ##Response:

Response:

In the above example prompt template for query expansion, the following named sections begin with a hash (i.e. #) and have the following meanings.

Section Instruction contains knowledge domain name 113 (i.e. "economic and finance domain") and task alignment with role and behavior 110. Section Instruction says you that is LLM 140.

Section Example is schema-analysis one-shot example 111 discussed later herein.

Section Input contains data structures 105-106 discussed later herein.

Section Response is empty even after template instantiation.

In the above example prompt template for query expansion, section Instruction is static (i.e. does not contain placeholders), although other sections are dynamic and contain the following named placeholders enclosed in curly braces (i.e. { }) may be dynamically replaced with actual text during instantiation. These placeholders have the following meanings.

one_shot_example is schema-analysis one-shot example 111 discussed later herein.

column_physical_name is the original name of column 121.

table_physical_name is the original name of data table 123.

table_markdown_representation contains data structures 105-106 discussed later herein.

Prompt templates facilitate three degrees of variability. One variability is task. Herein, query expansion is one of three tasks at respective times T1 and T4-T5. Each task has its own distinct prompt template. Another variability is customization and configurability, which is handled herein by template placeholders into which dynamic text may be inserted during template instantiation. Placeholder one_shot_example is for customization and configurability. The following is a reusable example schema-analysis one-shot example 111 for query expansion, and LLM 140 comprehends this one-shot example, even if components 113, 123, 141-143, and 161-162 are not about healthcare.

```
## Input
Generate metadata for the column 'DiagnosisCode' of the
'PAT_RECORDS' table.
Table:
|   PatientIdNum | DiagnosisCode   | AdmDate    | DisDate    |
TotalCost |
|--------------:|:---------------|:----------|:----------|--
---------:|
|          54254 | I50.9           | 2013-04-05 | 2013-04-07 |
250.5   |
|          12576 | C50.911         | 2013-04-08 | 2013-04-17 |
1890.15 |
## Response:
The 'Diagnosis Code' column contains the diagnosis code
associated with each patient's condition, likely based on a
standardized medical coding system. Datatype could be
VARCHAR2 (20) .
```

Another variability in prompt templates herein is dynamic text by placeholders. For example, a same prompt template may be reused to process multiple data tables or multiple columns, and different text may be inserted into placeholders when processing a respective table or column. In the above example prompt template for query expansion, all of the above named placeholders are dynamic text for a currently processed column, except for placeholder one_shot_example that is for configurability. The following is an example placeholder table_markdown_representation that is generated by reading column 121. The following example dynamic text for placeholder table_markdown_representation consists of nine named columns of table 123, where the first two (i.e. id and date) are columns 121-122, in three lines of text that are instead shown as six lines of text for demonstrative readability.

```
|    id |    date |    amount | currency_code    |    loan_id |
|-----:|-------:|---------:|:---------------|----------:|
|    nan |    nan |       −50 | BWP              |       nan |
|    source | type             |    value_date |    version_id |
|---------:|:---------------|------------:|------------:|
|       nan | further_advance |               nan |            nan |
```

The above example text for placeholder table_markdown_ representation consists of three lines of text. The top text line is table header 106 that is a sequence of original names of nine columns, where the name of column 121 is id. The middle text line is a separator that is ignored. The bottom text line is table row 105 that may be any row from data table 123 and, if table row 105 is the first row in data containers 121-123, then the value in column 121 for the first row is value A as shown in FIG. 1, which is above value nan (i.e. not a number, NaN) in above column id.

At time T1, linguistic prompt 144 is instantiated from the above example prompt template for query expansion with all of the dynamic text discussed above. At time T1, LLM 140 accepts linguistic prompt 144 as input and responsively inferentially generates initial column summary 132 from linguistic prompt 144. The following is an example initial column summary 132.

The 'id' column contains a unique identifier for each loan transaction record. Datatype could be INTEGER.

1.3 Dense Retrieval from Vector Store

Vector store 154 may be a huge knowledge base as discussed later herein and, at times T4-T5, LLM 140 accepts instances of linguistic prompt 144 that contain knowledge from vector store 154. However, vector store 154 is not used at time T1. Because initial column summary 132 is not based on the immense knowledge in vector store 154, initial column summary 132 may be slightly inaccurate, which is remedied as discussed later herein. For example, NaN cannot be an integer. Thus, example initial column summary 132 suggesting integer is wrong and is, in an embodiment, a predefined default guess when datatype inference has insufficient input information. Above example initial column summary 132 says "could be" to indicate uncertainty that is resolved at later time T4.

LLM 140 is generative. Although not shown, computer 100 also contains an encoder (i.e. embedder) LLM that does not generate text. The encoder LLM performs dimensionality reduction by lossy compression to inferentially generate a small fixed-size encoding of any text such as natural language, JavaScript object notation (JSON) even if not well formed as discussed later herein, or any inferred summary herein, such as initial column summary 132. The encoder LLM accepts variable-sized text as input and infers output as an array of numbers of fixed length, referred to herein as a vector. The encoder LLM performs learned semantic encoding, and herein a vector is a semantic encoding of a text. Two semantically similar texts should have similar vectors, and two semantically dissimilar texts should have dissimilar vectors. Between two vectors, semantic similarity or semantic distance (i.e. dissimilarity) is quantifiably measurable and, in that way, semantic similarity of two texts may be measured. In an embodiment, cosine similarity quantifiably compares the semantics of two vectors.

Each of predefined reference documents 141-143 is processed herein as variable-length text that is segmented into small fixed-size (e.g. measured in lexical tokens) portions 150-153, and this segmentation disregards syntax but does not divide a token into parts (e.g. in different portions). For example in portion 151, natural language 116 might begin and/or end with a partial sentence. Likewise in portion 152, semi-structured fragment 117 is JSON that might not be well formed. The encoder LLM accepts input text regardless of syntax and regardless of syntactic validity, and this amorphousness of input text does not decrease the semantic accuracy of the encoder LLM.

Before time T1, vector store 154 already was prepopulated with reference documents 141-143 as follows. The encoder LLM individually semantically encodes each of portions 150-153 into a respective vector (not shown). Portions 150-153 and their vectors are stored in vector store 154 for accelerated semantic search and retrieval. Vector store 154 operates as a map between keys and values, where portions 150-153 are stored values, and their vectors are stored keys. In an embodiment, vector store 154 also stores, or can locate for retrieval, whole reference documents 141-143.

Referred to herein as dense retrieval because a vector is a dense (i.e. lossy) encoding of text, vector store 154 accepts a vector that is a dense key that is used as a lookup key and responsively: 1) from a huge count of stored portions, finds a few most similar vectors by performing an accelerated similarity search and 2) returns the portions from which those found similar vectors were generated. In that way at time T2, vector store 154 accepts the vector of initial column summary 132 as input and, responsively at time T3, finds and returns nearest neighbors 155 that, in the shown embodiment, contains the top three most semantically similar portions 150-152 that, in the shown example, are a mix of portions of natural language and portions of JSON. For example, reference document 141 may be an online user manual such as in a webpage, and reference document 142 may instead be a schema of a column or data table (i.e. not data table 123 and, for example, not even in a same database) in JSON format as discussed later herein.

1.4 Query-Focused Summarization (QFS)

As discussed earlier herein, initial column summary 132 may be incomplete, too terse, or even inaccurate and, for increased accuracy, this is mitigated at time T4 that performs query-focused summarization (QFS) as follows. The following is an example QFS prompt template that can be instantiated at time T4 to generate an instance of linguistic prompt 144.

#Instruction

You will be given a query and a set of documents. Your task is to generate an informative, fluent, and accurate query-focused summary. To do so, you should obtain a query-focused summary step by step. Make sure to template your response following the output instructions.

Step 1: Query-Relevant Information Identification

In this step, you will be given a query and a set of documents. Your task is to find and identify query-relevant information from each document. This relevant information can be at any level, such as phrases, sentences, or paragraphs.

During this step focus specifically on information related to the '{{column_physical_name}}' column and avoid extracting information related to columns with different names, unless it's needed describe the target column '{{column_physical_name}}'.

Step 2: Controllable Summarization

In this step, you should take the query and query-relevant information obtained from Step 1 as inputs. Your task is to summarize this information. The summary should be concise, include only non-redundant and query-relevant evidence. Avoid adding specific information that you have not extracted during step 1 and avoid not-informative text, e.g. "Based on step 1 information [ . . . ]".

During this step focus specifically on information related to the '{{column_physical_name}}' column. If no relevant information can be found and summarized, include "Unfortunately no information was found related to this field." in the Step 2 output.

Query:

Generate a detailed description for the content of a column called '{{column_physical_name}}' coming from the table '{{table physical_name}}'. Describe the needed concepts and also report the datatype of the column if information about it is available. Avoid any information related to columns with different names.

Documents:

{{K retrieved chunks of documentation, separated by a new-line}} ##Output templating instructions:

Make sure to template your response following the output instructions. 'Step 1: Query-Relevant Information Identification' and 'Step 2: Controllable Summarization' the beginning of each part of the response.

Example:

Step 1: Query-Relevant Information Identification

<your step 1 answer here>

Step 2: Controllable Summarization

<your step 2 answer here>

Response

The above example QFS prompt template contains the following named sections that have the following meanings. Section Instruction specifies steps 1-2 and task alignment with role and behavior 110. Step 1 gathers and filters relevant information. Step 2 specifies how to generate expanded column summary 131 that is an improved (i.e. more accurate) reformulation of initial column summary 132. For example unlike initial column summary 132, expanded column summary 131 is complete and correct. In the above example QFS prompt template, section Documents has a template placeholder for inserting reference portions 156 that, at time T4, contains nearest neighbors 155 (i.e. portions 150-152). In the above example QFS prompt template, angle brackets (i.e. < >) do not indicate template placeholders, but instead are indicators to LLM 140 for how to structure and arrange inferentially generated output. The following is an example expanded column summary 131 as inferentially generated by LLM 140 at time T4.

Step 1: Query-Relevant Information Identification

From the provided documents, the information related to the 'id' column is as follows:

Document 1: "Column Name": "id", "Column Description": "The unique identifier for the record within the firm.", "DataType": "VARCHAR2 (20)"

Document 3: "Column Name": "id", "Column Description": "The unique identifier for the record within the firm.", "DataType": "VARCHAR2 (20)"

Document 5: "Column Name": "id", "Column Description": "The unique identifier for the record within the firm.", "DataType": "VARCHAR2 (20)"

Document 8: "Column Name": "loan_id", "Column Description": "The unique identifier for the affected loan/s within the financial institution.", "DataType": "VARCHAR2 (20)"

No information was found for the column 'id' in document 2, 4, 6, and 7, as they contain information related to different columns.

Step 2: Controllable Summarization

The 'id' column in the 'loan_trxs_schema' is a unique identifier for the record within the firm. It has a data type of VARCHAR2 (20) and is used to identify the affected loan/s within the financial institution. The 'id' column can be found in multiple tables, including 'Loan Transaction Schema' and 'Loan Schema', and is used in various contexts such as linking products as part of a larger deal and identifying the originator of the loan product.

In this embodiment, above example expanded column summary 131 is a sequence of two subsections that are steps 1-2, where step 1 is a subsection that, in this example, contains text lines starting with "-Document" that each is a highly relevant part (i.e. not a whole) of a distinct portion in nearest neighbors 155. According to above example expanded column summary 131, nearest neighbors 155 consists of portions 1-8 respectively from Documents 1-8. Portions 1, 3, 5, and 8 are relevant (i.e. semantically similar) to initial column summary 132, and portions 2, 4, and 6-7 are irrelevant (i.e. semantically dissimilar) to initial column summary 132 even though nearest neighbors 155 contains those irrelevant portions. LLM 140 inferentially detects which portions are relevant and irrelevant. In that way, LLM 140 increases accuracy by detecting and ignoring false positives from vector store 154. Above step 2 consists of an inferred natural language column summary that, unlike initial column summary 132, is complete and correct, including values restriction 135 that is a precise datatype of column id (i.e. column 121) that, in this example, is a variable-length string that cannot exceed twenty characters. Each of above Documents 1-8 is a reference document that, in this example, is a data schema in JSON format for some respective data table.

In various examples herein, data schema 133 is a table schema that describes data table 123. Data schemas herein are descriptive, not prescriptive, which means that each can describe an existing data table but will not be used to create a new data table. Although both of data schema 133 and a data definition language (DDL) CREATE TABLE statement provide a definition of a data table, data schema 133 is for analytic purposes and not for database construction. In that way, data schema 133 is burdened with fewer design concerns than CREATE TABLE, and the JSON grammar is much simpler than the CREATE TABLE grammar. JSON is a data interchange (i.e. interoperability) format, and a JSON parser is generic. A SQL parser is highly specialized because SQL is a rich domain specific language (DSL), and a SQL parser may be limited to a particular SQL dialect. Due to increased generality of JSON and JSON tooling, downstream applications 161-162 can readily parse and analyze data schema 133 even if they cannot parse DDL. In that way, downstream applications 161-162 can, for example, readily comprehend data table 123 even if a DDL schema of data table 123 is unavailable, and even if data table 123 is not a database table. For example, reference document 142 may be a data schema in JSON format for a data table that is not data table 123, which is why above step 1 shows relevant portions 1, 3, 5, and 8 as key-value pairs (i.e. from JSON).

By training or by vector store 154, LLM 140 comprehends interoperability standard 136 that may be for example: a) International Organization for Standardization (ISO) 4217 that defines standard currency codes for representing money or b) ISO 8601 that defines standard string formats for representing dates and times. At time T4 even if LLM 140 cannot read data table 123 as discussed elsewhere herein, LLM 140 inferentially detects that values A-C in column 121 conform to interoperability standard 136, and this recognition may facilitate inferential formulation of values restriction 135. For example, linguistic prompt 144 may contain most frequent values 108 that includes some or all of values A-C. For example, most frequent values 108 may be a top two most frequent values, such as values A and C as shown in column 121.

1.5 Metadata Generation to Inferentially Generate Table Schema or Column Schema At time T5, LLM 140 performs metadata generation by inferring data schema 133 that is JSON as discussed earlier herein. Each occurrence of time T5 inferentially generates, for one of data containers 121-123, a respective instance of data schema 133. If data schema 133 is inferred for one of columns 121-122, then data schema 133 is a column schema. If data schema 133 is instead inferred for whole data table 123, then data schema 133 is a table schema. As discussed earlier herein, computer 100 has three distinct prompt templates respectively for query expansion, QFS, and metadata generation. For example, those three templates may be sequentially used to instantiate three structurally-distinct instances of linguistic prompt 144 in a prompt chain. Herein are two prompt chains that are one chain to infer a column schema and one chain to infer a table schema. The two prompt chains do not share prompt templates with each other, and each prompt chain has three unique prompt templates. That is in an embodiment, computer 100 has 2 chains×3 templates=six unique prompt templates. Example prompt templates herein are for the prompt chain that infers a column schema.

The following is an example prompt template for metadata generation to inferentially generate a column schema as JSON at time T5.

You are a helpful assistant for Metadata Generation. You will interact with a data scientist interested in understanding some data.

Your pivotal role is to comprehend the queries and data provided by the user, to craft precise responses in JSON format, devoid of any extraneous text. These responses must encapsulate pertinent information to the user query, describing the data in the most clear and complete way, with the final objective to allow the user to navigate complex data landscapes with ease. For each input table, you will be provided with some context such as the schema, documentation and samples. Make sure to use all the information you have to first understand the table and then generate high quality metadata.

You should answer with a JSON object, adhering to the formatting instructions you will receive together with each question. Don't hallucinate or make up any information or fact, be serious and faithful in completing your task.

#Task

Specifically, your task is to generate meaningful and faithful metadata for a column of a table. Note that the physical name of the column is usually abbreviated.

You should generate the following metadata for that column:

the logical name of the column, i.e. a natural language name for the column, which should be concise yet clear and complete. It should help a human reader identify a column and quickly understand its content.

a complete and faithful description of the data that the column contains. This will be used by analysts to understand the dataset, so make sure it's complete, clear and relevant to the domain.

the appropriate data type for the samples contained in that column, choosing from the following: NUMERIC, DATE and STRING. If NUMERIC, specify also precision (total number of digits) and scale (number of digits dedicated to decimal part), by generating "NUMERIC (precision, scale)". If STRING, specify the maximum number of characters needed to represent the data, by generating "STRING (num chars)". If DATE, then specify the format of the date, e.g. "DATE (dd-mm-yyyy)". Make sure you choose a relevant datatype depending on the column content, for example, identifiers (IDs) and codes are usually strings, while money amount will often just have two decimal digits but might have both positive/negative and high/low values.

To make you understand better the data and complete your task at best, you will be provided with some context, namely:

the table schema, with a small amount of samples. By seeing the columns and how samples look like, you can better understand the structure and relations, needed to have a good understanding of the column of interest.

the domain to which data belong. This will help you understanding and using domain-specific vocabulary and acronyms.

a small summary describing the samples collected in the column of interest. Note that sample values and statistics should NOT be part of the description, rather used to get a better understanding of what that data represent and is used for.

some optional documentation of the dataset. Note that the documentation might be missing, but if some relevant information is provided as documentation, you should use it to provide the best description for the column.

a suggested datatype, which is inferred from the samples. Note that this might not always be the most correct datatype. If information about hte datatype are provided in the documentation, then use those.

in case your generation was not satisfactory to a human domain-expert, you will also see your previous output together with a feedback you should use to improve or correct the metadata your generation.

Make sure to provide columns metadata relevant to the domain, exploiting both your knowledge about that domain and the context just described.

Here is a satisfactory example:

{{static one_shot_example}}

Now, following the previous instructions generate column metadata for the column '{{column_name}}' of the table {{table_name}}.

Input:

Table name:

{{table_name}}

Column physical name:

{{column_name}}

Table:

{{table_markdown_representation}}

Domain:

{{subject_area}}

Summary of the samples in '{{column_name}}':

{{samples_summary}}

Suggested minimum type for the column '{{column_name}}':

{{suggested_data_type}

Documentation of the column:

{{documentation_context}}

Format Instructions:

. . . json

{

"physical_name": //physical name of the column, '{{column name}}' in this case

"logical_name": //natural language (logical) name of the column

"description": //description of the column content

"datatype": //data type for the column}.

}

. . .

{{regeneration context}}

Response:

The above example metadata generation prompt template contains the following named placeholders that have the following meanings (e.g. receive the following data). Placeholder subject_area receives knowledge domain name 113. Some of the placeholders in this prompt template are for inserting previously inferentially generated text. For example, placeholder suggested_data_type receives values restriction 135, and placeholder documentation_context receives expanded column summary 131, shown as column summary(s) 137 that is one column summary for column metadata generation and instead is, as discussed later herein, multiple column summaries for table metadata generation. In the above example metadata generation prompt template, section Format Instructions consists of JSON that receives JSON-formatting one-shot example 112.

Placeholder samples_summary includes column statistics about column 121 including numeric statistic 109, most frequent values 108, distinct value count 107, and missing-value row count 103 that is how many rows in data table 123 have no value in column 121. The following is example text for placeholder samples_summary at time T5.

No samples were available for this column. Try to infer how data should look like considering the column name and context.

Generally placeholder samples_summary should instead be text that is similar in arrangement to the following pedantic example text that LLM 140 comprehends.

Data Type (in Python): object
Number of Entries: 3
Number of Unique Values: 3
Number of Missing Values: 0
Top 10 Most Common Values: 150.9, C50.911, E11.9,
Most Common Value: C50.911

As an example column schema that is inferentially generated at time T5 for column id that is column 121, the following is an example data schema 133 that contains named fields logical_name and description, both of which are inferred natural language.

{
"physical_name": "id",
"logical_name": "Loan Transaction ID",
"description": "A unique identifier for each loan transaction within the financial institution.",
"datatype": "STRING (20)"
}

1.6 Inferential Generation of Multiple Column Schemas

Times T1-T5 may be repeated for some or all columns 121-122 in data table 123 to generate multiple distinct column schemas as distinct instances of data schema 133. Each of those multiple distinct column schemas may contain a distinct natural language summary of the respective column. For table metadata generation to infer data schema 133 as a table schema at time T5, linguistic prompt 144 may contain those multiple distinct column schemas, including their natural language column summaries shown as column summary(s) 137. In linguistic prompt 144 for table metadata generation at time T5, the following is an example column summary(s) 137 that is JSON that includes previously inferred natural language, and LLM 140 comprehends this JSON and the natural language within it.

{
“table”: “The ‘Loan Transactions Schema’ table provides a comprehensive overview of loan transactions, including unique identifiers, loan IDs, transaction types, dates, and version information. It captures various transaction types, ensuring a detailed record of loan-related activities.”
“columns”: {
“id”: “The ‘id’ column is a unique identifier for each record within the firm. It is a variable character data type with a length of 20.”,
“date”: “The ‘date’ column in the ‘Loan Transaction Schema’ table represents the date and time of a loan transaction event. It is formatted as YYYY-MM-DDTHH: MM: SSZ, following the ISO 8601 standard, and its data type is ‘DATE’.”,
“amount”: “The ‘amount’ column in the ‘Loan Transactions Schema’ table contains the size of the transaction in the loan event. It is a monetary value represented as a positive integer number of cents/pence, with a data type of NUMBER (22, 3).”,
“currency_code”: “The ‘currency_code’ column in the ‘Loan Transaction Schema’ table contains the currency code of the transaction in accordance with ISO 4217 standards, with an additional code CNH for practical considerations. The data type is VARCHAR2 (20) and the list of values includes various currency codes such as AED, AFN, ALL, AMD, ANG, AOA, ARS, AUD, AWG, and more.”,
“loan_id”: “The ‘loan_id’ column is a unique identifier for loans within a financial institution. It is a 20-character string (VARCHAR2) and is used to identify the affected loan/s in the ‘Loan Transaction Schema’ table.”,
“source”: “The ‘source’ column in the ‘Loan Transactions Schema’ table contains the source(s) of the data, which can be multiple and separated by a dash. The datatype is VARCHAR2 (20).”,
“type”: “The ‘type’ column in the ‘Loan Transactions Schema’ table describes the impact on the loan balance, which can be ‘acquisition’, ‘advance’, ‘capital repayment’, ‘biennially’, or ‘sesquiennially’. The data type is VARCHAR2 (20).”
“value_date”: “The ‘value_date’ column in the ‘Loan Transaction Schema’ table contains the timestamp of the transaction valuation or occurrence. It follows the ISO 8601 standard with the format YYYY-MM-DDTHH: MM: SSZ and has a data type of DATE.”,
“version_id”: “The ‘version_id’ column is a unique identifier for the version of the data, which can be used to identify the firm’s internal batch. It is a VARCHAR2 (20) data type.”
}
}

JSON is composable (i.e. nestable) and, for example, a JSON object (e.g. array or key-value dictionary) may contain nested JSON object(s). At time T5, LLM 140 may infer data schema 133 as a table schema that is JSON that contains column schemas that are nested JSON. In that way, the following is an example data schema 133 that is an inferred table schema for data table 123.

{
“table_physical_name”: “Loan_Transactions_Schema”,
“table_logical_name”: “Loan_Transaction_Records”,
“table description”: “This table offers a comprehensive view of loan transactions, featuring unique identifiers, loan IDs, transaction types, dates, and version control. It meticulously records various transaction types, providing a detailed account of loan activities. The table includes information on transaction amounts, currencies, and sources, enabling effective tracking and analysis of loan-related financial data.”,
“columns metadata”: {
“id”: {
“column_physical_name”: “id”,
“column_logical_name”: “Record ID”,
“column_description”: “A unique identifier for each record in the Loan Transactions table, used to distinguish individual entries.”,
“datatype”: “STRING”,
“precision”: 20,
“scale”: null,
“date_format”: null
},
“date”: {
“column_physical_name”: “date”,
“column_logical_name”: “Transaction Date”,
“column_description”: “The date and time of a loan ransaction, adhering to the ISO 8601 standard format.”,
“datatype”: “DATE”,
“precision”: null,
“scale”: null,
“date_format”: “yyyy-MM-dd ‘T’HH:mm:ss‘Z’”
},
“amount”: {
“column_physical_name”: “amount”,
“column_logical_name”: “Transaction Amount”,
“column_description”: “Monetary value of the loan transaction, represented as a positive integer number of cents/pence.”,
“datatype”: “NUMERIC”,
“precision”: 22,
“scale”: 3,
“date_format”: null
},
“currency_code”: {
“column_physical_name”: “currency_code”,
“column_logical_name”: “Currency Code”,
“column_description”: “The currency_code of the loan transaction, following ISO 4217 standards with an additional code for practical use.”,
“datatype”: “STRING”,
“precision”: 3,
“scale”: null,
“date_format”: null
},
“loan_id”: {
“column_physical_name”: “loan_id”,
“column_logical_name”: “Loan Identifier”, "column_description": "A unique identifier for each loan, used to track and reference specific loan transactions within the financial institution's records.",
"datatype": "STRING",
"precision": 20,
"scale": null,
"date_format": null
},
"source": {
"column_physical_name": "source",
"column_logical_name": "Data Source",
"column_description": "A field containing the source(s) of the loan transaction data, which can be multiple and separated by a dash. This could include various data providers or systems.",
"datatype": "STRING",
"precision": 20,
"scale": null,
"date_format": null
},
"type": {
"column_physical_name": "type",
"column_logical_name": "Transaction Type",
"column_description": "The type of transaction, indicating the impact on the loan balance. This can include acquisition, sale, capitalisation, securitisation, and more.",
"datatype": "STRING",
"precision": 20,
"scale": null,
"date_format": null
},
"value_date": {
"column_physical_name": "value_date",
"column_logical_name": "Transaction Value Date",
"column_description": "The date and time of the loan transaction valuation or occurrence, following the ISO 8601 standard.",
"datatype": "DATE",
"precision": null,
"scale": null,
"date_format": "yyyy-MM-dd'T'HH:mm:ss'Z'"
},
"version_id": {
"column_physical_name": "version_id",
"column_logical_name": "Data Version ID",
"column_description": "A unique identifier for different versions of the loan transaction data, allowing for tracking and managing updates or changes to the dataset.",
"datatype": "STRING",
"precision": 20,
"scale": null,
"date_format": null
}
}
}

2.0 Example Process to Inferentially Generate Data Schema

FIG. 2 is a flow diagram that depicts an example process that computer 100 performs to inferentially generate JavaScript object notation (JSON) that is data schema 133 as a table schema or a column schema.

During query expansion at time T1 in step 201, large language model (LLM) 140 inferentially generates initial column summary 132 (or an initial table summary) that consists of natural language that describes exactly one column 121 or exactly one data table 123. Step 202 entails times T2-T3 as follows. At time T2 in step 202, the encoder LLM inferentially generates a vector that is a dense semantic encoding of initial column summary 132. From vector store 154 that contains many fixed-size portions 150-153 of many reference documents 141-143 at time T3, step 202 dense retrieves a few potentially relevant nearest neighbors 155.

Time T4 entails steps 203-204 for query-focused summarization (QFS) as follows. At time T4, LLM 140 performs a duty cycle that entails accepting some instance of linguistic prompt 144 as input and responsively inferentially generating expanded column summary 131 (or an expanded table summary) as output. However during any duty cycle for any linguistic prompt, LLM 140 may internally perform multiple constituent inferences that may affect the ongoing generation of, for example, expanded column summary 131. For QFS at time T4 in steps 203-204, any constituent inference and the overall inference of the duty cycle may entail inferencing from any part of the whole input of the duty cycle, which is linguistic prompt 144 that, at time T4, contains initial column summary 132 and reference portions 156.

Discussed earlier herein are portions 1-8: a) nearest neighbors 155 may consist of portions 1-8; b) portions 1, 3, 5, and 8 are relevant to initial column summary 132; and c) portions 2, 4, and 6-7 are irrelevant even though nearest neighbors 155 contains those irrelevant portions. In step 203 at time T4, LLM 140 inferentially detects that nearest neighbor portion(s) 2, 4, and 6-7 are irrelevant and should be excluded from further inferential analysis, such as analysis by next step 204. In step 204 at time T4, LLM 140 inferentially generates expanded column summary 131 that describes exactly one column 121. In an embodiment shown in the example expanded column summary 131 earlier herein, step 203 may inferentially decide that at least one additional column is relevant (i.e. should not be excluded), such as portion 8 and should be provided to step 204. In portion 8, column loan_id is not column 121 and is not in data table 123 but, because portion 8 is included as part of the input to step 204, inferential generation by step 204 may be partially based on portion 8 that does not expressly describe column 121.

From expanded column summary 131 in linguistic prompt 144 at time T5, LLM 140 inferentially generates: a) data schema 133 that consists of JSON that is semi-structured text that describes column 121 or describes data table 123 and b) in data schema 133, column comment 134 that contains: i) natural language that describes the column or table and, in some embodiments, ii) at least three distinct values from column 121 even if data schema 133 is a table schema. For example, example column summary(s) 137 presented earlier herein has column currency_code that, in accordance with the International Organization for Standardization (ISO) 4217 standard, has nine values such as AED, AFN, ALL, AMD, ANG, AOA, ARS, AUD, and AWG. All nine of those literal values are shown as expressly enumerated in example column summary(s) 137. Likewise, a data schema 133 for column 121 or for data table 123 may contain multiple distinct values from column 121 that is column id, such as multiple distinct identifier values.

3.0 Example Prompt Refinement and Inferential Activities

FIG. 3 is a flow diagram that depicts example inferential activities that computer 100 may perform to regeneratively refine an instance of data schema 133 that is a table schema for data table 123. The processes and steps of FIGS. 2-3 are compatible and can be combined or interleaved. Steps 302-305, 309-310, and parts of steps 306 and 308 may be inferential activities that large language model (LLM) 140 may perform, and these inferential activities do not read any of data containers 121-123.

As discussed earlier herein for LLM 140, there may be a total of six unique prompt templates in two shown prompt chains 321-322. Times T1-T3 occur before the process of FIG. 3 that does not begin until time T4 with column prompt chain 321. The process of FIG. 3 is biphasic with a preprocessing phase that includes all of times T1-T5 separately in each of prompt chains 321-322 as discussed below, followed by runtime phase 323 that entails one or more of downstream applications 161-162 that accept at least one instance of data schema 133 as input.

As discussed earlier herein, column prompt chain 321 may be repeated for each of columns 121-122 in data table 123 and, as discussed below, such repetition may be needed to generatively infer column metadata as input to table prompt chain 322. Additionally as discussed later herein, schema generation at time T5 by either of prompt chains 321-322 may include a feedback control-flow loop for prompt refinement to increase accuracy of data schema 133 by inferential regeneration. That is, either or both of prompt chains 321-322 may have a feedback loop that causes repetition of time T5 without causing repetition of times T1-T4. Thus, computer 100 has three multiplicities: 1) multiple prompt chains 321-322, 2) multiple columns 121-122, and 3) multiple iterations in a feedback loop in either of prompt chains 321-322. In this example: a) steps 301-305 use the entirety of column prompt chain 321, including all three column prompt templates; and b) steps 306-307 use the entirety of table prompt chain 322, including all three table prompt templates.

During any duty cycle for any linguistic prompt as discussed earlier herein, LLM 140 may internally perform multiple constituent inferences that may affect the ongoing generation of an inferred output of LLM 140. In linguistic prompt 144 for metadata (i.e. schema) generation by column prompt chain 321 at time T5, step 301 includes knowledge domain name 113. Steps 302-303 are a sequence of related constituent inferences that may occur for query-focused summarization (QFS) at time T4.

Step 302 inferentially detects that most or all values already retrieved from column 121 conform to interoperability standard 136. For example: a) interoperability standard 136 may be International Organization for Standardization (ISO) 4217 for money currency; b) ISO 4217 forbids a colon (i.e. ':') character; c) distinct values count 107 may be six; d) most frequent values 108 contains all six distinct values; and e) a count of zero or more of the six distinct values contain a colon. A count in (e) of zero by step 302 may cause step 302 to infer that column 121 conforms to ISO 4217. Conversely, a positive count may cause step 302 to infer that column 121 does not conform to ISO 4217. This constituent inference by step 302 may cause additional constituent inference(s) in steps 302-303. For example, step 302 may infer that column 121 contains money values because column 121 conforms to ISO 4217.

Step 303 infers values restriction 135 for column 121. For example, recognition of interoperability standard 136 by step 302 may cause step 303. For demonstration, step 304 may involve column 122 instead of 121 because, in this example, column 122 is not bound to a semantic datatype such as money or time per ISO 4217 or 8601. In that case, step 304 may inferentially detect that column 122 does not contain values from the knowledge domain identified by knowledge domain name 113. For example, example column summary(s) 137 presented earlier herein contains inferred natural language that says: a) "column version_id" and b) "identify the firm's internal batch." Step 304 may inferentially detect that, for example, most frequent values 108 are not values from the named knowledge domain and may further inferentially detect that column 122 is for implementation-specific internal use only. For example: a) data table 123 may be a relational database table; b) column 122 may be the primary key of data table 123; and c) all values in column 122 were autogenerated by the database system such as with a serial number counter that provides no semantics in the named knowledge domain.

Step 305 inferentially generates multiple expanded column summaries respectively for multiple columns 121-122 in data table 123, and this may entail repeating some or all of steps 301-304 for each of columns 121-122. The horizontal dashed line between steps 305-306 indicates that column prompt chain 321 is not used after step 305 in this example. Although prompt refinement steps 306-307 use table prompt chain 322 in this example, all of steps 306-307 may also or instead occur with column prompt chain 321. LLM 140 may sometimes be inaccurate at metadata generation at time T5, which iterative prompt refinement remedies as follows.

Herein, each of prompt chains 321-322 contains and executes logic. At time T5, step 306 entails processing by components 140 and 322 in sequence as follows. First in step 306, LLM 140 inferentially generates data schema 133 that in this example is a table schema. Second in step 306, table prompt chain 322 obtains an indication of whether or not data schema 133 contains a defect. In an embodiment, step 306 uses one, two, or all of the following sources of defect feedback. A first feedback source is interactive (i.e. manual) and entails a technician entering (e.g. typing or speaking) natural language that is feedback such as commentary that may indicate some or all of: a) what type of defect, b) which part of data schema 133 is defective, c) what existing information was improperly analyzed, and d) new information to complement the existing information.

The second and third feedback sources for step 306 are automatic. The second feedback source consists of a parse error that may be caused either by: a) data schema 133 is JavaScript object notation (JSON) that is not well formed or b) in an embodiment, data schema 133 contains natural language that is detectably grammatically incorrect. The third feedback source are rules or constraints that data schema 133 should satisfy. An automatic feedback source may, for example, provide some or all of: an error message, an error code, and an error location into data schema 133.

If step 306 determines that data schema 133 is defective, then remedial prompt refinement occurs as follows in step 307. Into a second instance of linguistic prompt 144 for more accurate metadata generation, step 307 inserts defect declaration 114 that indicates a defect that was found in data schema 133. The arrow from step 307 back to step 306 is shown bold to indicate that this is repetition in a control flow loop that is a feedback loop. Repetition of step 306 repeats time T5 and regenerates a more accurate data schema 133. In an embodiment, interactive feedback from a technician is not solicited until all automatic feedback sources are satisfied (i.e. find no defect).

Step 306 decides when iterative prompt refinement ceases, and this also is the end of the preprocessing phase discussed above. When preprocessing finishes, inferred data schema 133 is ready for deployment into a production runtime environment as indicated by the horizontal dashed line between steps 307-308. Although data schema 133 may be deployed as soon as step 306 decides to stop preprocessing, much time may elapse between step 306 and, as follows, either of steps 308 and 310 during runtime phase 323 in production.

Downstream applications 161-162 operate only during runtime phase 323 in production. In a self-contained embodiment: a) computer 100 may be as few as one computer; and b) depending on the embodiment, downstream applications 161-162 can use LLM 140 for further inferential generation such as discussed below. In a distributed embodiment instead: a) computer 100 may be two computers that are a preprocessing computer that performs the preprocessing phase and a runtime computer that performs runtime phase 323; and b) in a decoupled embodiment, only instance(s) of data structures 121-123 and 133 are shared between both computers and, for example, the runtime computer does not contain and does not use some or all of the following: prompt templates and components 140-144, 154, and 321-322.

Either or both of downstream applications 161-162 may operate, including receiving and analyzing data schema 133. If downstream application 161 should operate, then downstream application 161 performs steps 308-309, including text-to-SQL-to-text (i.e. structured query language) natural language processing (NLP) as follows. Additionally or instead, downstream application 162 performs step 310, including schema mapping as discussed later herein.

Step 308 is caused by a (e.g. nontechnical) user interactively entering (e.g. typing or speaking) natural language question 102 that is (e.g. implicitly, not expressly) related to data table 123. Before step 308, the following acceleration can conditionally occur to avoid steps 308-309. From data schema 133 and based on natural language column comment 134, before step 308, data schema 133 is (e.g. not inferentially or, if inferentially, by LLM 140 or not) analyzed to detect whether or not data schema 133 contains enough information to answer natural language question 102. For example if natural language question 102 asks if loan transactions have times in addition to dates: a) natural language answer 101 may be (e.g. inferentially or not) generated from data schema 133 that is a table schema for data table 123; and in that case, b) generating natural language answer 101 entails reading none of data containers 121-123 and performing none of steps 308-309; c) natural language answer 101 is returned to the user without text-to-SQL and without generating SQL statement 171; and d) in that case, steps 308-309 do not occur.

If data schema 133 does not contain enough information to answer natural language question 102, then steps 308-309 occur as follows. From natural language in data schema 133 such as column comment 134, step 308 (e.g. inferentially) generates SQL statement 171 that references data containers 121 and/or 123. Step 308 executes SQL statement 171, including retrieving a value from column 121. From the value from column 121 and the natural language in data schema 133 such as column comment 134, step 309 performs SQL-to-text by (e.g. inferentially) generating natural language answer 101 that correctly answers natural language question 102. Step 309 returns natural language answer 101 to the user that entered natural language question 102.

From natural language in data schema 133 such as column comment 134, step 310 (e.g. inferentially) generates tables schemas mapping 172 that is a schema mapping between two table schemas, including data schema 133 that is a table schema in this example. For example from tables schemas mapping 172, step 310 may further (e.g. inferentially) generate SQL statement(s) that can read data from the table of one of the two table schemas and write data to the table of the other table schema. These SQL statement(s) may be executed to migrate data from one table to another table in a same or different database.

4.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Over View

Figure 5:
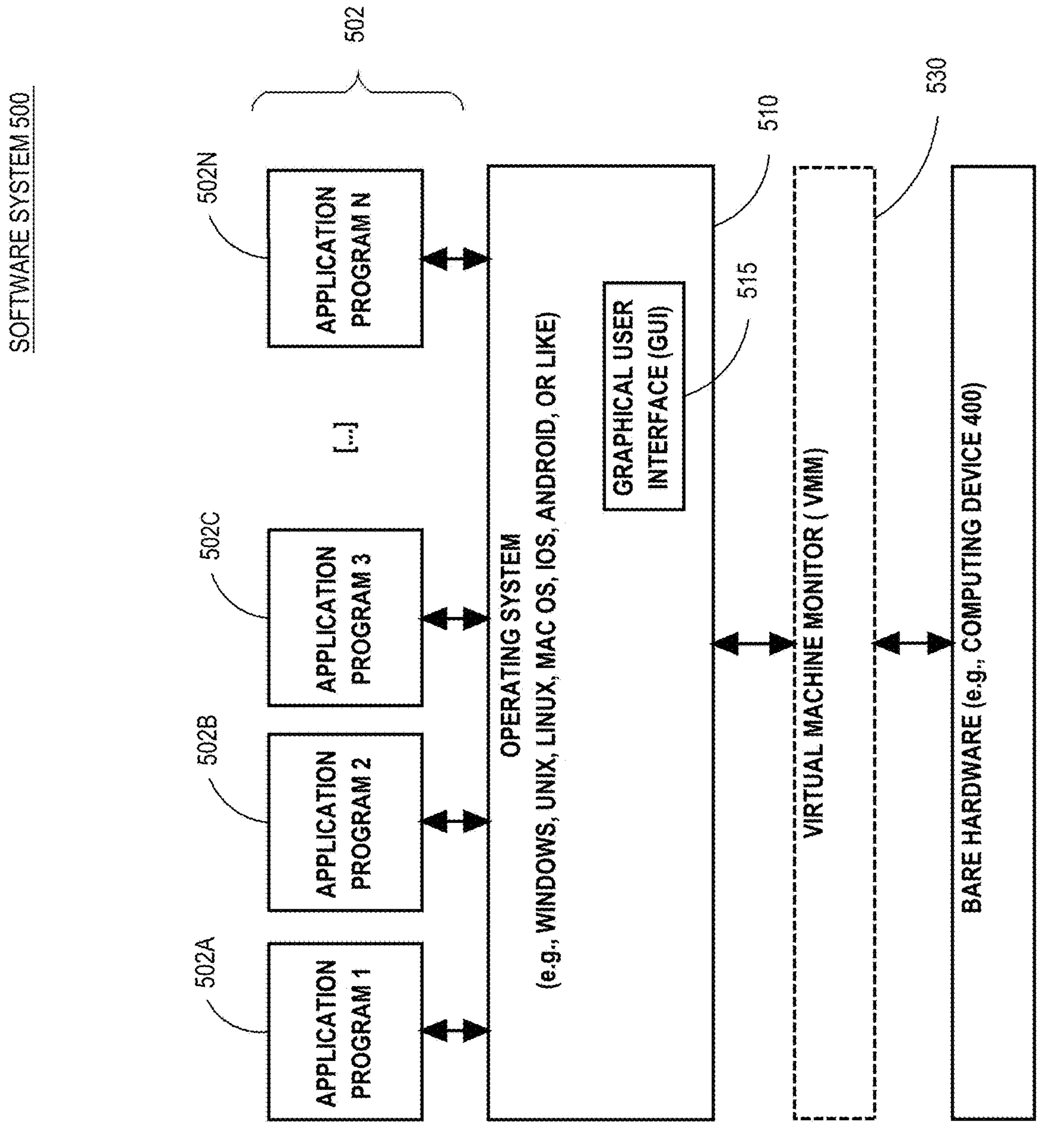
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an laaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 25; 2(1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

inferentially generating, by a large language model (LLM), an initial column summary that consists of natural language that describes exactly one column;

dense retrieving, from a vector store that contains a plurality of fixed-size portions of a plurality of reference documents, a plurality of nearest neighbor portions that are semantically similar to the initial column summary;

inferentially generating by the LLM, from the initial column summary and the plurality of nearest neighbor portions, an expanded column summary that describes the exactly one column, including inferring that one of the plurality of nearest neighbor portions should be excluded; and inferentially generating by the LLM, from the expanded column summary:

a) a data schema that consists of semi-structured text that describes i) the column or ii) a data table that contains the column and b) in the data schema, a column comment that contains natural language that describes the column.

2. The method of claim 1 wherein:

said data schema is a table schema for the data table;

the method further comprises for the data table, inferentially generating a plurality of expanded column summaries that includes said expanded column summary;

said inferentially generating the table schema is based on:

a) the plurality of expanded column summaries and b) a second plurality of nearest neighbor portions from the vector store that are semantically similar to an inferred summary of the data table.

3. The method of claim 1 wherein said inferentially generating the expanded column summary comprises inferring a restriction on values in the column.

4. The method of claim 3 wherein said inferring the restriction comprises inferentially detecting that said values in the column conform to an interoperability standard.

5. The method of claim 1 further comprising:

including, in a linguistic prompt, a declaration of a defect that was found in the data schema;

repeating, based on the linguistic prompt, said inferentially generating the data schema.

6. The method of claim 5 wherein said declaration of the defect is interactively-entered natural language or a parse error caused by the data schema.

7. The method of claim 1 further comprising in a linguistic prompt, including at least one selected from a group consisting of:

a) a header of said data table, b) a row from said data table, c) a numeric statistic of values from the column, d) a most frequent plurality of values from the column, e) a count of distinct values in the column, f) a count of rows in the data table, g) a count of rows in the data table that are missing a value in the column, h) a one-shot example of how to solve a schema-analysis task, i) a one-shot example of how to format JavaScript object notation (JSON), and j) task-alignment natural language that defines a role for the LLM and behavior for the LLM.

8. The method of claim 1 wherein:

the method further comprises in a linguistic prompt, including a name of a knowledge domain;

said inferentially generating the data schema comprises inferentially detecting that the column does not contain values from the knowledge domain.

9. The method of claim 1 wherein said natural language contains at least three values from said column.

10. The method of claim 1 wherein said plurality of nearest neighbor portions includes:

a portion that contains natural language or a portion that consists of semi-structured text that is not well formed.

11. The method of claim 1 further comprising based on natural language in the data schema, performing at least one generative action selected from a group consisting of:

a) a generation and execution of a structured query language (SQL) statement that references said data table and said column, b) based on a value in said column, a generation of a natural language answer to a natural language question, and c) a generation of a mapping between two table schemas, including said data schema.

12. The method of claim 1 wherein said inferentially generating the expanded column summary that describes the exactly one column by referring to at least one additional column, including inferring that one of the plurality of nearest neighbor portions should not be excluded.

13. One or more non-transitory computer-readable media storing instructions that, when executed by one or more processors, cause:

inferentially generating, by a large language model (LLM), an initial column summary that consists of natural language that describes exactly one column;

dense retrieving, from a vector store that contains a plurality of fixed-size portions of a plurality of reference documents, a plurality of nearest neighbor portions that are semantically similar to the initial column summary;

inferentially generating by the LLM, from the initial column summary and the plurality of nearest neighbor portions, an expanded column summary that describes the exactly one column, including inferring that one of the plurality of nearest neighbor portions should be excluded; and inferentially generating by the LLM, from the expanded column summary:

a) a data schema that consists of semi-structured text that describes i) the column or ii) a data table that contains the column and b) in the data schema, a column comment that contains natural language that describes the column.

14. The one or more non-transitory computer-readable media of claim 13 wherein:

said data schema is a table schema for the data table;

the instructions further cause for the data table, inferentially generating a plurality of expanded column summaries that includes said expanded column summary;

said inferentially generating the table schema is based on: a) the plurality of expanded column summaries and b) a second plurality of nearest neighbor portions from the vector store that are semantically similar to an inferred summary of the data table.

15. The one or more non-transitory computer-readable media of claim 13 wherein said inferentially generating the expanded column summary comprises inferring a restriction on values in the column.

16. The one or more non-transitory computer-readable media of claim 13 wherein the instructions further cause:

including, in a linguistic prompt, a declaration of a defect that was found in the data schema;

repeating, based on the linguistic prompt, said inferentially generating the data schema.

17. The one or more non-transitory computer-readable media of claim 13 wherein the instructions further cause in a linguistic prompt, including at least one selected from a group consisting of:

a) a header of said data table, b) a row from said data table, c) a numeric statistic of values from the column, d) a most frequent plurality of values from the column, e) a count of distinct values in the column, f) a count of rows in the data table, g) a count of rows in the data table that are missing a value in the column, h) a one-shot example of how to solve a schema-analysis task, i) a one-shot example of how to format JavaScript object notation (JSON), and j) task-alignment natural language that defines a role for the LLM and behavior for the LLM.

18. The one or more non-transitory computer-readable media of claim 13 wherein:

the instructions further cause in a linguistic prompt, including a name of a knowledge domain;

said inferentially generating the data schema comprises inferentially detecting that the column does not contain values from the knowledge domain.

19. The one or more non-transitory computer-readable media of claim 13 wherein said plurality of nearest neighbor portions includes:

a portion that contains natural language or a portion that consists of semi-structured text that is not well formed.

20. The one or more non-transitory computer-readable media of claim 13 wherein the instructions further cause based on natural language in the data schema, performing at least one generative action selected from a group consisting of:

a) a generation and execution of a structured query language (SQL) statement that references said data table and said column, b) based on a value in said column, a generation of a natural language answer to a natural language question, and c) a generation of a mapping between two table schemas, including said data schema.

* * * * *